United States Patent [19]
Brown

[11] 3,818,176
[45] June 18, 1974

[54] PULSE WELDING PROCESSES
[75] Inventor: Kenneth W. Brown, Abington, England
[73] Assignee: The Welding Institute, Cambridge, England
[22] Filed: Aug. 18, 1972
[21] Appl. No.: 281,738

[30] Foreign Application Priority Data
Aug. 20, 1971  Great Britain.................. 39220/71

[52] U.S. Cl............................. 219/124, 219/131 F
[51] Int. Cl............................................. B23k 9/12
[58] Field of Search.......... 219/124, 131 F, 137, 76, 219/126, 125 PL

[56] References Cited
UNITED STATES PATENTS
3,328,556   6/1967   Nelson et al.................. 219/125 R Primary Examiner—C. L. Albritton
Attorney, Agent, or Firm—Kemon, Palmer & Estabrook

[57] ABSTRACT

A metal arc welding process is described in which the arc is cyclically oscillated across and/or along the weld jointline during a weld, and in which the phase of the cyclic oscillations is correlated with the phase of a periodic metal transfer from the electrode to the workpiece such that each transference of metal takes place at a preselected instant during the cyclic movement of the arc.

8 Claims, 3 Drawing Figures

PULSE WELDING PROCESSES

In metal arc welding processes it is customary for an experienced manual welder to weave a pattern with the electrode tip while moving the electrode along the weld jointline in an attempt to obtain a uniform (or a particular non-uniform) heat and metal transfer distribution. For example, the welder may dwell on parts of the joint which have been insufficiently penetrated due to irregularities in the pre-welding joint preparation, and may pass rapidly over areas where the penetration is already complete.

In a spray transfer process using a 1/16 inch diameter commercially pure aluminium electrode fed at 200 inch/minute and with argon gas shielding, metal is transferred from the electrode to the workpiece at a mean free-flight droplet rate of about 200 drops/second. The time interval between each droplet varies considerably so that the welder has no control over the precise instant at which each metal transfer takes place and accurate control of the heat and metal transfer distribution along the weld jointline is consequently impossible. Similarly, in a dip transfer process using a 3/64 inch diameter steel electrode fed at 120 inch/minute, and with $CO_2$ gas shielding, metal transfer from the electrode to the workpiece occurs at a short-circuiting frequency of between about 25 and 100/second, a rate which is too high for a welder to accurately control the heat and metal transfer distribution along the weld joint. As in the first example the time interval between each metal transfer also varies considerably and makes accurate control of the distribution even more difficult.

In accordance with the present invention apparatus for a metal arc welding process includes means for relatively moving the welding electrode and a workpiece along a weld jointline, means for cyclically oscillating the arc across and/or along the weld jointline during the said relative movement, means for effecting a periodic metal transfer from the electrode to the workpiece, and means for correlating the phase of the cyclic oscillations with the phase of the periodic metal transfer such that each transference of metal takes place at a preselected instant during the cyclic movement of the arc. In this manner the heat and metal transfer input along the weld jointline can be programmed to provide heat and metal where it is most needed.

The oscillations of the arc will generally be obtained by oscillating the electrode itself, but magnetic arc deflection is one possible alternative either with or without accompanying electrode movement. The oscillations will generally be at a distinctly higher speed than is possible with manual weaving.

In a controlled spray transfer process (such as that described in U.S. Pat. No. 3,071,680) a pulsating current is fed to the arcing electrode, each pulse being of sufficient magnitude to detach a drop of fused electrode metal, and the phase of the cyclic oscillations is then correlated with these pulses of welding current. For example when welding with a 1/16 inch diameter commercially pure aluminium electrode fed at 100 inch/minute with argon gas shielding, a background current of 50A, and a mean pulse current of 50A (230A peak) giving 50 drops per second, a superimposed cyclic oscillation of the electrode transverse to the weld jointline at a frequency of 12½ cycles/second, correlated in phase to the pulses of current, will produce four discrete droplets during each electrode oscillation cycle, each droplet being detached at a predetermined instant during the cycle and therefore at a predetermined position relative to the jointline.

Alternatively, in a controlled dip transfer process, the transfer of metal may be effected by axially oscillating the electrode toward and away from the workpiece. In this case metal is transferred each time the electrode reaches its lowest position (due to surface tension forces as well as the high short-circuit current) and the cyclic oscillations across and/or along the jointline are then correlated with the axial oscillations. For example if the axial oscillations produce a short-circuiting frequency 25/second, a cyclic oscillation transverse to the weld jointline of 12½ cycles/second may be correlated with the phase of the axial oscillations to give two metal transfers during each of the transverse oscillations, the metal transfers occurring at predetermined instants and therefore at predetermined positions relative to the jointline. In addition the arc current may be electronically reduced or increased either for a predetermined period synchronised with the oscillation, or for a variable period in response to signals derived from the welding circuit, whenever a short-circuit is formed in order to assist the metal transfer mechanism.

By more accurately controlling the heat and metal transfer distribution along a weld jointline it is possible to obtain a squarer bead and to compensate for slight mistracking of the jointline. When welding thick-to-thin sections the metal transfer can be programmed electrically or mechanically to control the proportion of time the electrode dwells on either side of the jointline so that a correctly proportioned heat input is obtained giving uniform penetration on the thick and thin members and without undercutting. Other advantages which stem from the correlation of metal transfer with the transverse oscillation of the electrode tip are a capacity to direct heat to the correct locations in V and U groove joints and a reduction in sidewall fusion defects in multi-pass groove welds. The avoidance of undercutting also means that the heat input can be better directed along the weld edges, particularly in fillets. Oscillations of the electrode tip longitudinally along the weld jointline is particularly useful in reducing the porosity of a weld by producing a stirring action in the weld pool.

In one embodiment of the invention in which pulses of current are supplied to the electrode to detach the metal droplets, the phase of the pulses is synchronised with the mains frequency which also controls the electrode oscillation. Alternatively the phase of the pulses may be controlled in response to the cyclic movement of the electrode so that a pulse is fed to the electrode whenever the electrode reaches a predetermined position in its oscillation cycle. The heat input/metal transfer pattern along the weld jointline may then be controlled either by means of an open-loop system in which the welder preselects the required pattern, or in a closed-loop system in which the heat penetration along the weld jointline is sensed by a sensing device, such as a pattern of infra-red photocells, and the resulting signals are used to select the required pattern. The heat input may be controlled, for example, by varying the mark-space ratio of the welding pulses, and the metal transfer can be controlled by varying the traverse speed of the workpiece.

Where the jointline is not straight or varies in width it may be advantageous to include a joint position detector/transducer so that metal is transferred in response to a signal from the transducer indicating that the electrode tip is correctly positioned over the jointline.

In order that the invention may be more clearly understood, some examples will now be described with reference to the accompanying drawings in which.

In all the above figures the gas shielding of the arc and weld metal has been omitted for clarity.

Figure 1:
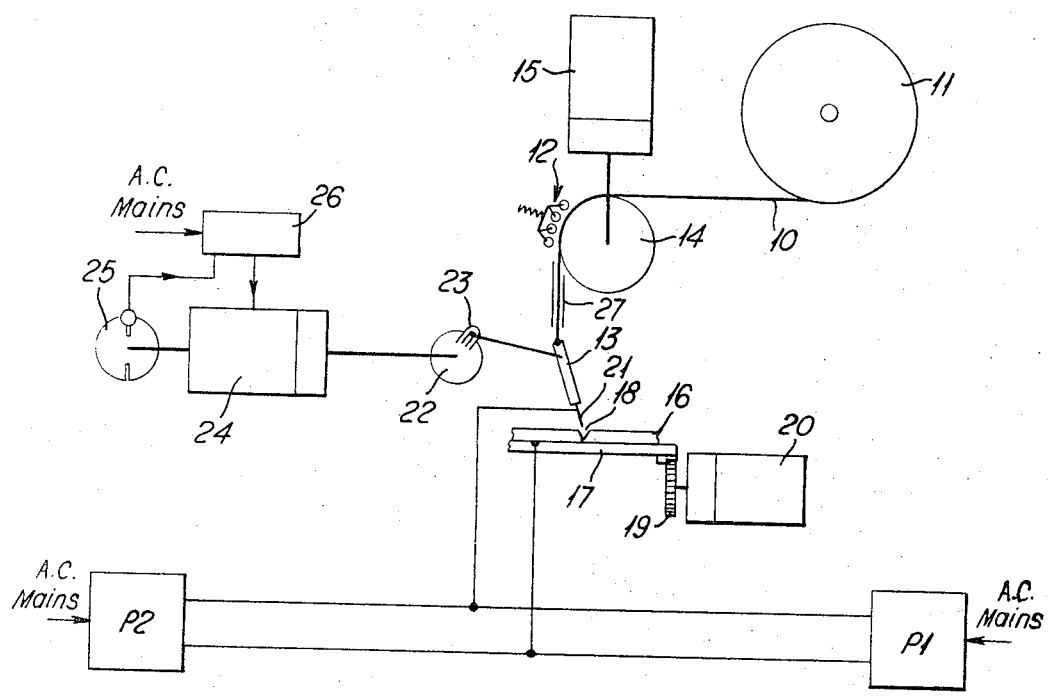
FIG. 1 is a schematic diagram of a metal arc gas shielded welding process in which the welding current pulses and the oscillations of the electrode are synchronised with the mains frequency.

Referring first to FIG. 1 a consumable electrode wire 10 is fed from a storage reel 11 through a multi-roll wire feed device 12 and a guide 27 to a welding gun 13. The main drive roll 14 is driven from a variable speed electric motor 15 which controls the wire feed rate.

A workpiece 16 carried on a support 17 is moved in the direction of the weld jointline 18 by means of a transverse drive gear 19 driven from a variable speed traverse motor 20. During this movement the electrode tip 21 is oscillated transversely to the weld jointline by means of an eccentric shaft and crank 22, 23 driven from a synchronous motor 24 locked to mains frequency. The motor 24 includes a mechanical phase shift control.

A background power source P1 and a heavy current power source P2 respectively maintain the arc and supply current pulses to the electrode which are sufficient to detach droplets of metal. The two power sources are locked to mains frequency and the welding current pulses therefore occur at the mains frequency. Since the synchronous oscillator motor 24 is also locked to mains frequency the phase of the welding current pulses is correlated with the transverse oscillations of the arc. The synchronous motor 24 is locked to mains frequency using a phase control unit 26 which may include a phase comparator for comparing pulses derived from a photo-chopper disc 25 on the motor shaft with pulses derived from the A.C. mains, and a low frequency multivibrator having its output gated by the comparator output to control the firing of a triac in the supply to the motor. In operation the control unit 26 switches power to the motor cyclically until phase coincidence is achieved and the power is then locked on via the phase comparator and gating.

Figure 2:
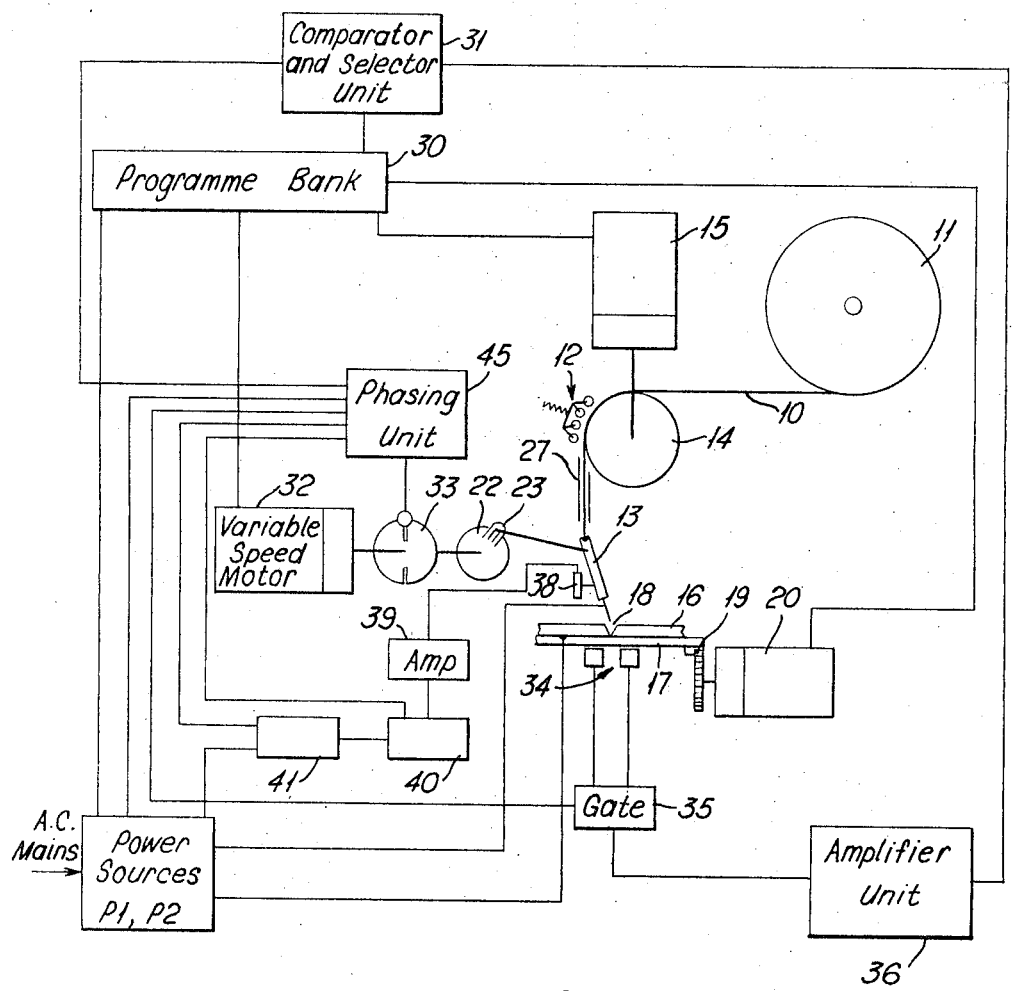
FIG. 2 is a schematic diagram of a metal arc gas shielded welding process in which the phase of the welding pulses is controlled in response to the cyclic oscillations of the electrode; and, FIG. 3 is a perspective view of a metal arc gas shielded welding process illustrating apparatus for simultaneously oscillating the welding electrode in two perpendicular planes.

FIG. 2 shows the same basic arrangement as FIG. 1 and like reference numerals are used to denote like parts of the apparatus. In this figure however the power input to the welding arc is not controlled by a welding operator but is automatically selected from a number of stored combinations in a programme bank 30. Such a bank may take the form of a plugboard such as that described in U.S. Pat. No. 3,581,051. The output signals from the plugboard adjust the various welding parameters in accordance with the particular programme selected, as described in the aforesaid patent.

The motor 32 is a variable speed motor which drives a photo-chopper disc 33 as well as the eccentric cam and crank 22, 23 controlling the electrode oscillations. A signal from the photo-chopper disc is fed to a phasing unit 45 which includes high-current solid state switching devices to chop the D.C. output of the main power source P1 and thus supply the welding pulses to the arc. Thus the welding current pulses are correlated with the oscillations of the electrode. The mark-space ratio of the welding pulses for a given pulse repeat frequency may be varied to control the heat penetration, as described, for example, in British Pat. No. 1,173,133.

The power input to the arc, the pulse repeat frequency, the mark-space ratio of the pulses, the oscillation frequency of the electrode and the traverse speed are all determined by the selected programme, and this in turn may be controlled by the welder or by the signals from a transducer array 34 which detect the heat penetration along each side of the weld jointline. The signals from the transducers on each side of the jointline are fed through a gate 35 which is selectively enabled by signals from the phasing unit 45 so that the appropriate transducer is connected to the amplifier 36 depending on the position of the electrode. The output from the amplifier is fed to the comparator and selector unit 31 where the amplitude of the signal is compared with preselected upper and lower limit values. The programme bank 30 may include a range of progammes for each side of the weld jointline and the comparator and selector unit 31 therefore also receives a signal from the phasing unit 45 so that the signals from, say, the right hand transducer automatically select a programme from those associated with that side of the joint. If the signal from the amplifier 36 is below the lower limit level, a new programme is automatically selected from the programme bank (using solid state switching) which increases the heat input to the appropriate side of the jointline. Similarly if the signal is above the upper limit level, a lower heat input is selected.

In addition, or alternatively, a joint position transducer 38 may be attached to the electrode oscillation linkage. The output from this transducer will detect the edges of the weld joint and the interval between successive signals will therefore provide an indication of the size of the joint gap. This is particularly useful when the size of the gap is varying or when the weld jointline is non-linear. The signal from the transducer 38 is fed to an amplifier 39 and then to a timer/scaler unit 40 in which the pulses from the transducer are compared with pulses from the phasing unit to produce an analogue voltage representing the joint position relative to the welding electrode. This analogue signal is fed to a delay 41 which is connected in the line from the phasing unit to the power source. Thus the feeding of a welding pulse to the welding electrode is delayed by an amount proportional to the amplitude of the signal from the timer/scale 40 and in this way metal is only transferred from the electrode when the electrode is correctly positioned over the weld jointline.

For a non-uniform joint gap where different amounts of metal are required at different positions along the weld jointline, the selector unit 31 may select different programmes from the programme bank 30 which vary the speed of the traverse motor 20 to provide a uniform metal deposition per unit length. For example a signal from the transducer array indicating an increase in the gap width would cause the selector to select a programme with a lower traverse speed.

Figure 3:
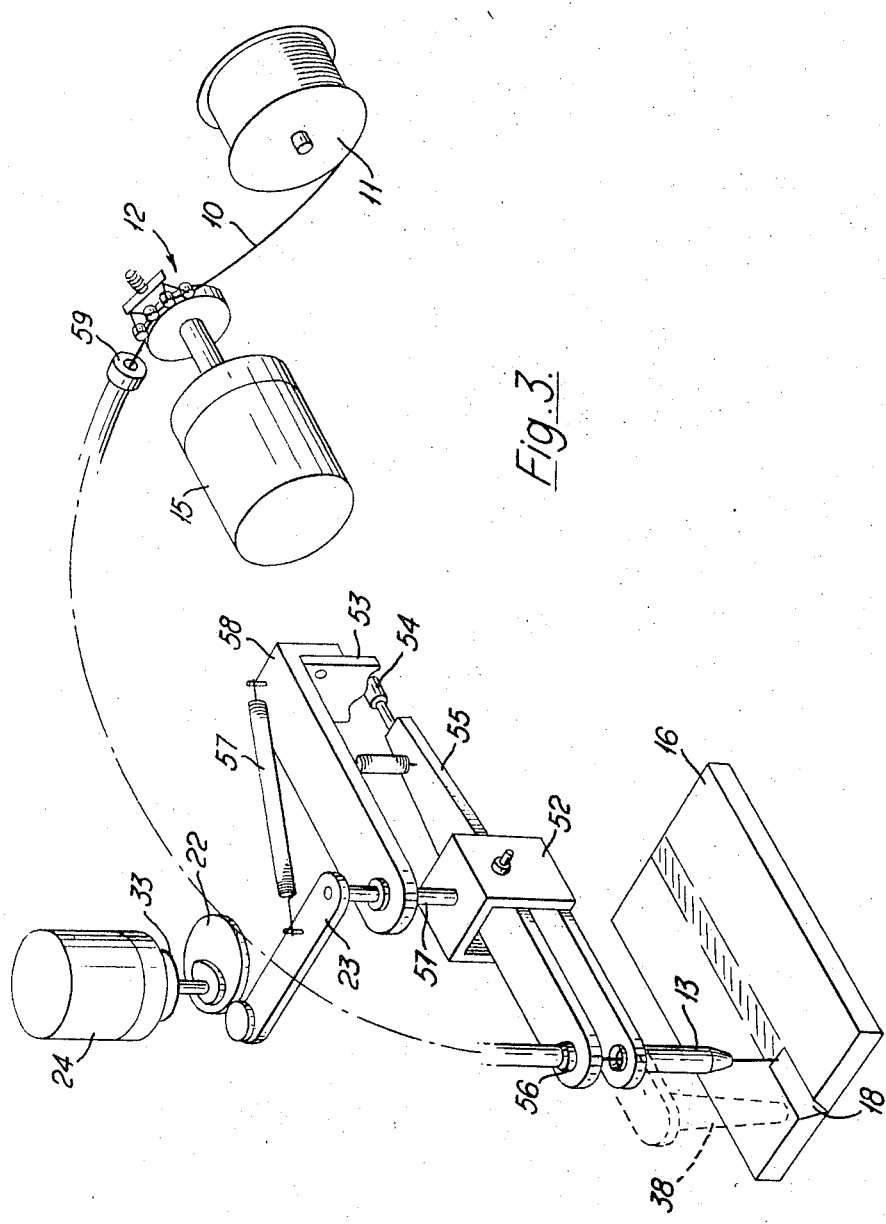

In both FIGS. 1 and 2 the electrode may also be given an axial oscillation by varying the wire feed rate. This could be done for example by driving the wire feed with a voltage controlled circuit based on the voltage between the electrode and the workpiece or by temporarily declutching the drive using an electrostatic clutch device. In FIG. 3 an alternative method of producing the axial oscillation is shown in which both the axial and transverse oscillations are produced from a single variable speed oscillator motor such as the motor 33 shown in FIG. 2. In FIG. 3 like reference numerals are again used to denote parts of the apparatus which are common to FIG. 1 or FIG. 2. The axial oscillations may assist a modified dip transfer mechanism and improve control of penetration, puddle fluidity and solidification or they may merely assist the droplet detachment produced by heavy current welding pulses.

In FIG. 3 the electrode wire is fed through a fixed inlet guide 59 into a flexible conduit 50 before being fed to the welding gun. The crank arm 23 is fixed to a shaft 51 which is rotatable in bearings mounted in a fixed bracket 58 connected to the arm 23 by a spring 57 and rigidly connected to the welding gun support 52 so that the electrode is oscillated transversely to the weld jointline in response to rotation of the motor 24. In addition an edge profile cam 53 is secured to the bracket 58 and causes an axial oscillatory motion to be transmitted to a cam follower 54 which is connected to one end of a rocking link 55. Since the rocking link 55 is pivoted in the gun support 52 it is simultaneously oscillating transversely to the weld jointline. At the other end of the link is conduit grip device 56 and the resulting oscillations of the flexible conduit produce corresponding axial oscillations of the electrode which will be directly correlated with the transverse oscillatory motion.

I claim:

1. Apparatus for a metal arc welding process including a welding electrode, means for relatively moving the welding electrode and a workpiece along a weld joint line, means for establishing an arc between the electrode and the workpiece, means for cyclically oscillating the arc in a direction parallel to the workpiece during said relative movement, means for effecting a periodic metal transfer from said electrode to said workpiece, and means for correlating the cyclic movement of the arc with said periodic metal transfer such that a predetermined number of transferances occur during each oscillation of the arc and each transference occurs at at least one predetermined instant during each oscillation.

2. Apparatus as defined by claim 1 in which the cyclic oscillations of the arc are produced by oscillating the welding electrode.

3. Apparatus according to claim 1 in which the metal transfer effecting means comprises means for pulsing the arc current, each pulse being of sufficient magnitude to detach a drop of fused metal from the welding electrode.

4. Apparatus according to claim 2 further including a transducer for obtaining an electrical signal representing the displacement of the electrode, and a phase control unit responsive to the output of the transducer for controlling the phase of the welding pulses.

5. Apparatus according to claim 4 further including an array of transducers positioned to detect the heat penetration on each side of the weld jointline and means responsive to the output of the transducers for controlling the power delivered to the arc during each oscillation cycle.

6. Apparatus according to claim 2 further including means for synchronising the electrode oscillations and the phase of the welding pulses in each oscillation cycle with a mains supply frequency.

7. Apparatus according to claim 2 further including means for axially oscillating the electrode along its longitudinal axis during its other oscillatory motion.

8. Apparatus according to claim 1 in which the metal transfer effecting means comprises means for axially oscillating the electrode toward and away from the workpiece such that metal is transferred from the electrode to the workpiece each time the electrode reaches its lowest axial position.

* * * * *